United States Patent
Hioki et al.

(10) Patent No.: US 8,390,610 B2
(45) Date of Patent: Mar. 5, 2013

(54) DISPLAY APPARATUS WITH SCANNING LINES HAVING CONVEX AND CONCAVE PORTIONS

(75) Inventors: Tsuyoshi Hioki, Yokohama (JP); Yutaka Nakai, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 919 days.

(21) Appl. No.: 12/493,560

(22) Filed: Jun. 29, 2009

(65) Prior Publication Data

US 2009/0322736 A1    Dec. 31, 2009

(30) Foreign Application Priority Data

Jun. 30, 2008   (JP) ................ 2008-171601

(51) Int. Cl.
*G06F 3/038* (2006.01)
(52) U.S. Cl. .................. 345/212; 345/208
(58) Field of Classification Search ........... 345/73–81, 345/87–100, 204–215
See application file for complete search history.

(56) References Cited

U.S. PATENT DOCUMENTS

| | | | |
|---|---|---|---|
| 7,542,017 B2 | 6/2009 | Hioki et al. | |
| 2002/0027536 A1* | 3/2002 | Kimura | 345/75.1 |
| 2005/0231680 A1 | 10/2005 | Hioki et al. | |
| 2007/0080905 A1* | 4/2007 | Takahara | 345/76 |

FOREIGN PATENT DOCUMENTS

| | | |
|---|---|---|
| JP | 59-148030 A | 8/1984 |
| JP | 1-185692 | 7/1989 |
| JP | 2001-265265 A | 9/2001 |
| JP | 2005-221589 A | 8/2005 |
| JP | 2005-221590 A | 8/2005 |

OTHER PUBLICATIONS

U.S. Appl. No. 12/372,601, filed Feb. 27, 2009, Tsuyoshi Hioki.
U.S. Appl. No. 12/411,823, filed Mar. 26, 2009, Tsuyoshi Hioki, et al.
U.S. Appl. No. 12/686,037, filed Jan. 12, 2010, Hioki, et al.
U.S. Appl. No. 13/045,222, filed Mar. 10, 2011, Hioki, et al.
Japanese Office Action issued Aug. 21, 2012 in Patent Application No. 2008-171601 with English Translation.

* cited by examiner

*Primary Examiner* — Vijay Shankar
(74) *Attorney, Agent, or Firm* — Oblon, Spivak, McClelland, Maier & Neustadt, L.L.P.

(57) ABSTRACT

A display apparatus includes a plurality of optical waveguides which are arranged in a row and have light output areas, a plurality of light sources which emit light beams incident upon the optical waveguides, a plurality of scanning lines whose cross-sections have convex portions and concave portions alternately positioned in a column, wherein inner surfaces of each of the convex portions and the concave portions are arranged so as to face the optical waveguides, and, by applying an electric field, the convex portions and the concave portions undergo displacement, and a control unit which controls the scanning lines with the application of an electric field sequentially.

8 Claims, 10 Drawing Sheets

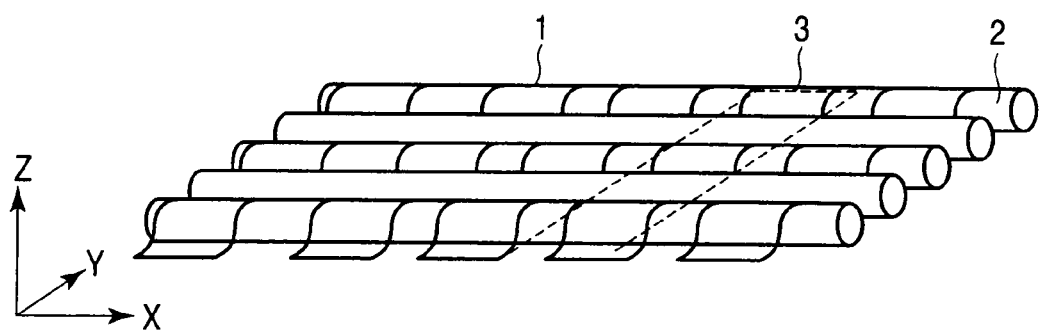
F I G. 1
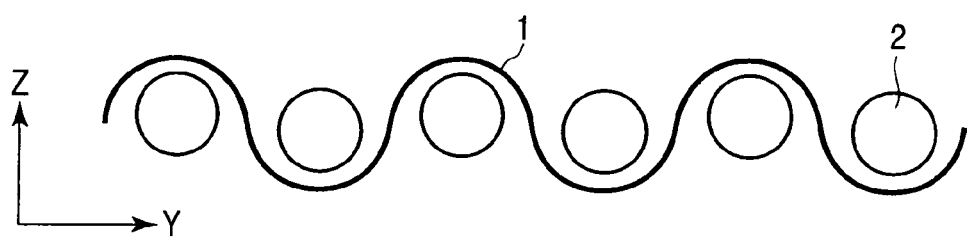
F I G. 2
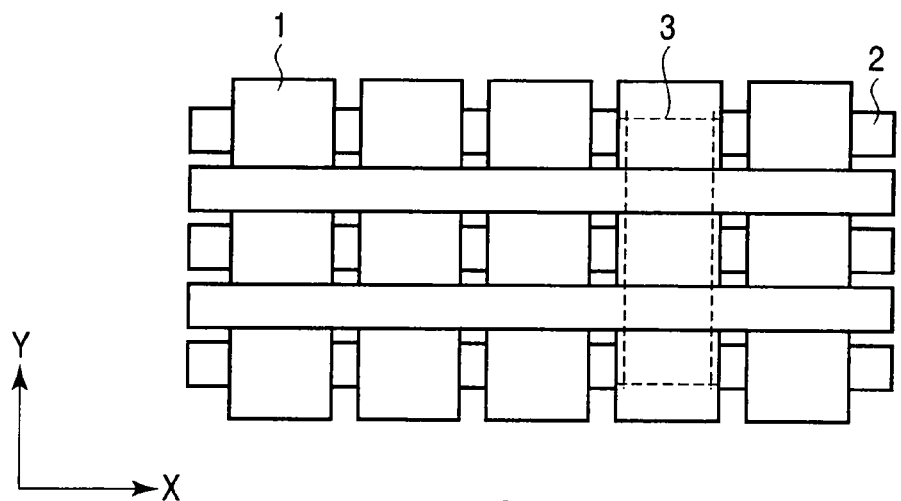
F I G. 3

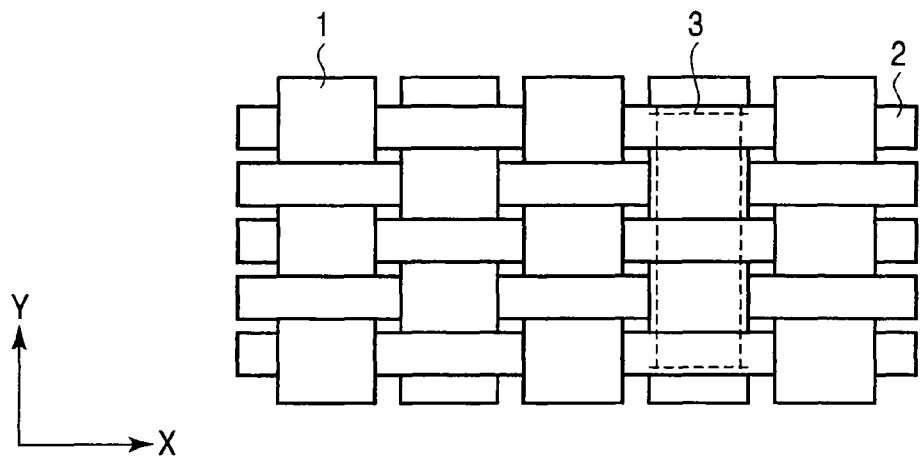
F I G. 11
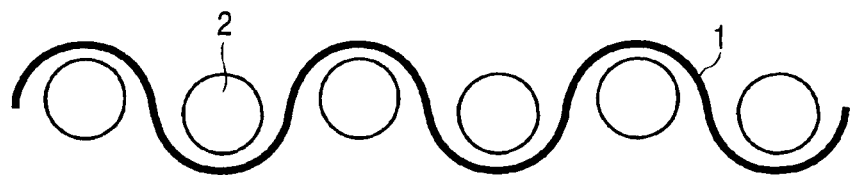
F I G. 12
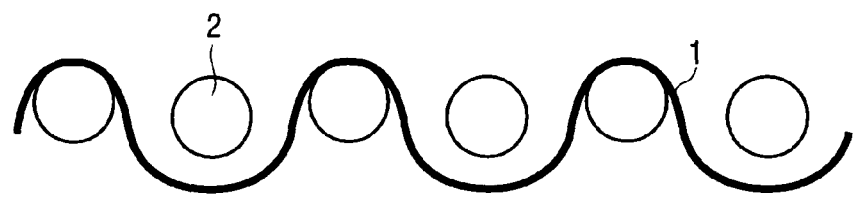
F I G. 13

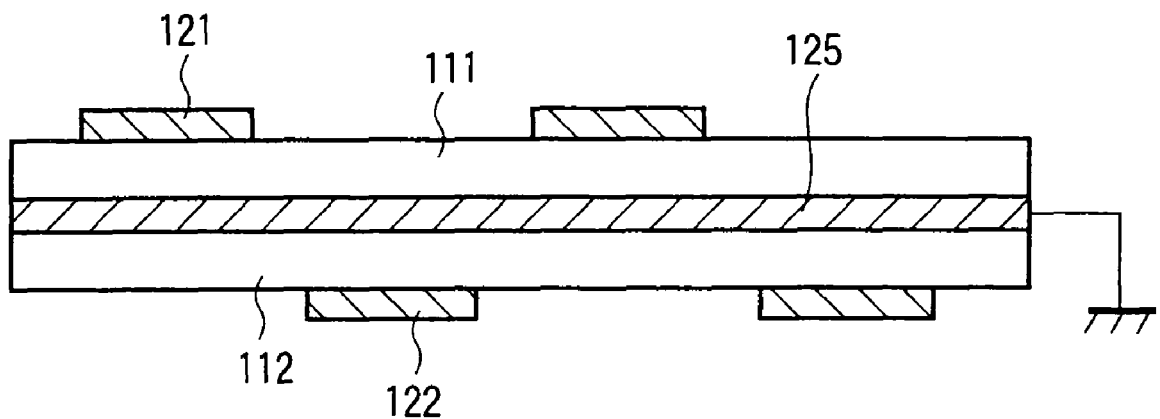
F I G. 17
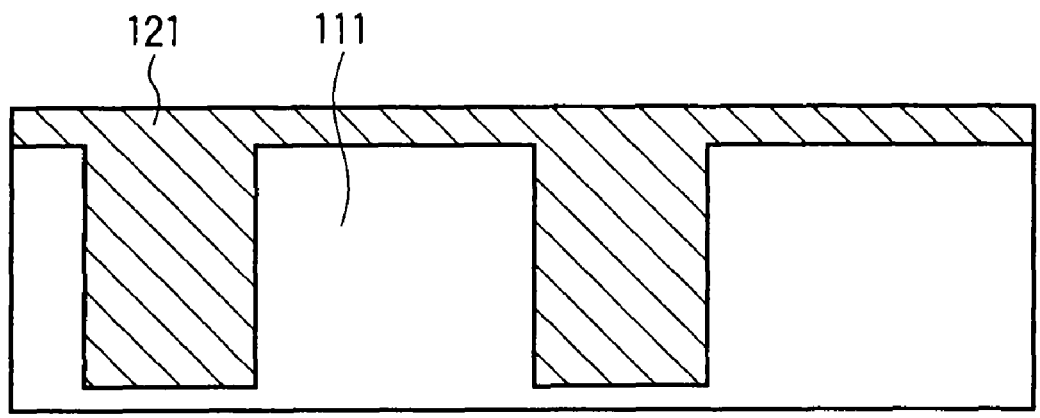
F I G. 18

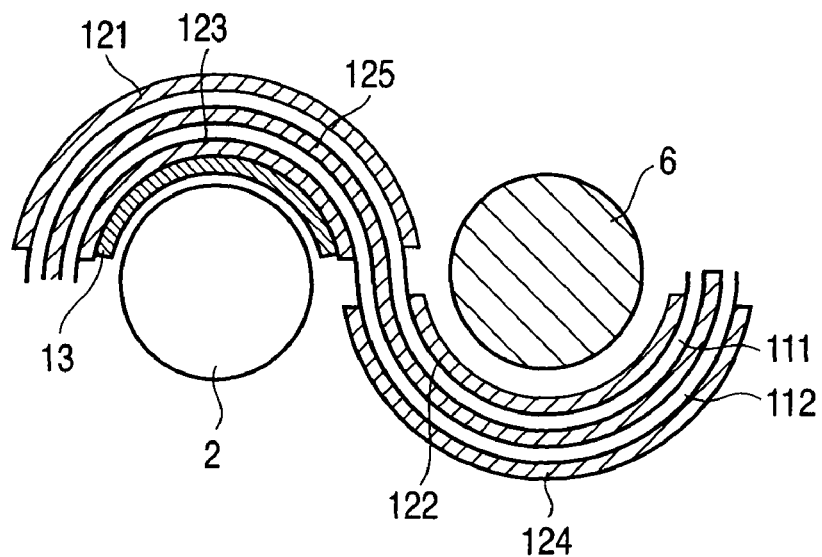
F I G. 19
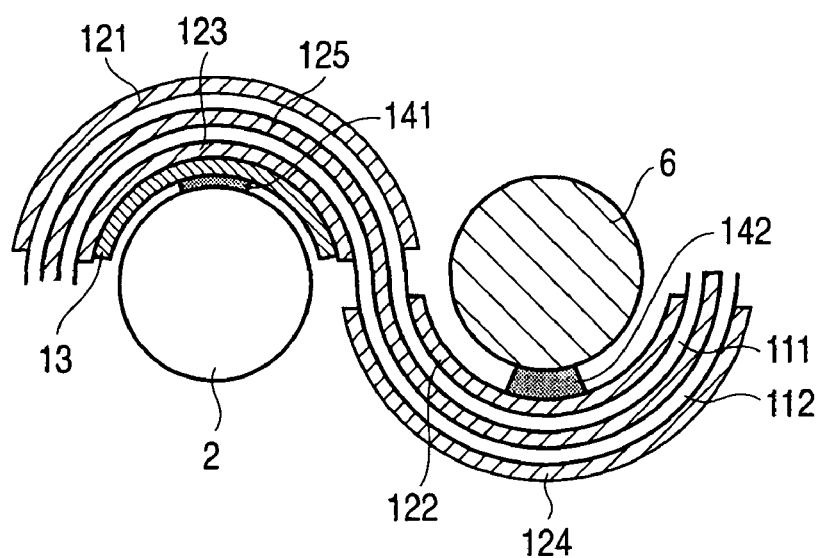
F I G. 20

DISPLAY APPARATUS WITH SCANNING LINES HAVING CONVEX AND CONCAVE PORTIONS

CROSS-REFERENCE TO RELATED APPLICATIONS

This application is based upon and claims the benefit of priority from prior Japanese Patent Application No. 2008-171601, filed Jun. 30, 2008, the entire contents of which are incorporated herein by reference.

BACKGROUND OF THE INVENTION

1. Field of the Invention

The present invention is related to a display apparatus having a structure integrated by a plurality of one-dimensional optical waveguides.

2. Description of the Related Art

Currently, as a widely used display apparatus, there is, for example, CRT (Cathode Ray Tube), LCD (Liquid Crystal Display), PDP (Plasma Display Panel), OLED (Organic Light Emitting Display) and FED (Field Emission Display). As for CRT, since depth is required in size due to carrying out electronic line scanning, currently, LCD, PDP, OLED and FED etc., which are referred to as FPD (Flat Panel Display), are becoming mainstream. Although each FPD has different schemes in, such as, light emitting mechanisms or light valves, light modulation is performed for each two-dimensionally arranged pixel. In order to transmit analogue information regarding this light modulation to each pixel, FPD is configured to take advantage of a matrix structure which has high accuracy. Accordingly, when preparing the FPD, techniques such as carrying out film forming by vacuum processes, such as a spatter method, which uses, for example, a large area substrate such as a glass substrate, or a highly accurate shape formation technique represented in photo-etching processes are adapted.

Meanwhile, a method which does not carry out light modulation on each pixel positioned at the intersection point of matrix wiring is also being considered. In this method, light modulation etc. is carried out on portions other than the pixel portions. Light is emitted after being guided to a desired position. This configuration allows light which is incident from a light source upon an optical waveguide so as to satisfy total reflection conditions to have its light emitting position defined at a position in a part of the optical waveguide by, for example, displacement of a light output element. Further, according to this method, the role of each pixel portion can be reduced to guiding light adjusted to a desired strength and selecting light output.

For example, JP-A 1-185692 (KOKAI) suggests a method which, instead of providing a light source and a light modulating element such as a light valve to each pixel, carries out light modulation by using a strength modulator attached to a light source. After the light is guided to a desired pixel position, it is emitted at the pixel position. In other words, after the light whose strength is adjusted at the light source is transmitted to a desired position by light guiding under total reflection conditions of an optical fiber, refractivity of a core material at such position is changed, and light is emitted. By changing the refractivity of the core material partially by applying electric field, it becomes an area which does not satisfy total reflectance in the optical fiber. Therefore, in an area which does not satisfy total reflectance condition, the guided light is emitted from a side surface of the optical fiber.

However, a scanning driving method for display is required in a display apparatus having a structure integrated by a plurality of one-dimensional optical waveguides such as optical fibers. In the above mentioned display apparatus structure, scanning applies electric field to an optical waveguide and changes reflectivity to determine a scanning position. In order to carry out the scanning drive precisely, a precise structure formation is required in production.

BRIEF SUMMARY OF THE INVENTION

According to an aspect of the present invention, there is provided a display apparatus includes a plurality of optical waveguides which are arranged in a row and have light output areas; a plurality of light sources which emit light beams incident upon the optical waveguides; a plurality of scanning lines whose cross-sections have convex portions and concave portions alternately positioned in a column, wherein inner surfaces of each of the convex portions and the concave portions are arranged so as to face the optical waveguides, and, by applying an electric field, the convex portions and the concave portions undergo displacement; and a control unit which controls the scanning lines with the application of an electric field sequentially.

BRIEF DESCRIPTION OF THE SEVERAL VIEWS OF THE DRAWINGS

FIG. 1 is a perspective view of a display apparatus according to an embodiment of the present invention shown schematically.

FIG. 2 is a Y-Z plane cross-sectional view of the display surface shown in FIG. 1.

FIG. 3 shows an X-Y plane configuration of the display surface shown in FIG. 1.

FIG. 11 shows a configuration of an X-Y plane in the configuration shown in FIG. 10.

FIG. 12 shows a cross-sectional configuration example of a scanning line.

FIG. 13 shows an example of a state in which the scanning line shown in FIG. 12 has undergone displacement.

FIG. 17 shows another example of a cross-sectional configuration of an electrode arrangement in a scanning line.

FIG. 18 shows a plane configuration example of the electrode arrangement shown in FIG. 17.

FIG. 19 shows a detailed structural example of a cross-section of a scanning line.

FIG. 20 shows another detailed structural example of a cross-section of a scanning line.

DETAILED DESCRIPTION OF THE INVENTION

Embodiments of the present invention will be explained in detail by reference to the drawings, as follows.

As shown in FIG. 1, a display surface is provided with a plurality of optical waveguides 2 arranged along a direction X. A scanning line 1 has a corrugated cross section in which a convex portion and a concave portion are positioned alternately. An inner face of each of the convex portions and concave portions is arranged to face the above mentioned optical waveguide 2. FIG. 2 is a schematic view of a cross-sectional structure of the scanning line 1. As shown in the present drawing, the scanning line 1 is corrugated by forming a convex portion and a concave portion in accordance with the shape of the optical waveguide 2. The optical waveguide 2 is, for example, configured with a core portion of an optical fiber. By changing the refractivity of a clad layer, light which propagates in the optical waveguide 2 can be emitted from the area. The scanning line 1 is configured with, for example, a piezoelectric film having flexibility. With the application of an electric field to the scanning line 1, displacement occurs at the above mentioned convex portions and concave portions so as to give stress to a light emitting area of the optical wave guide 2.

Figure 4:
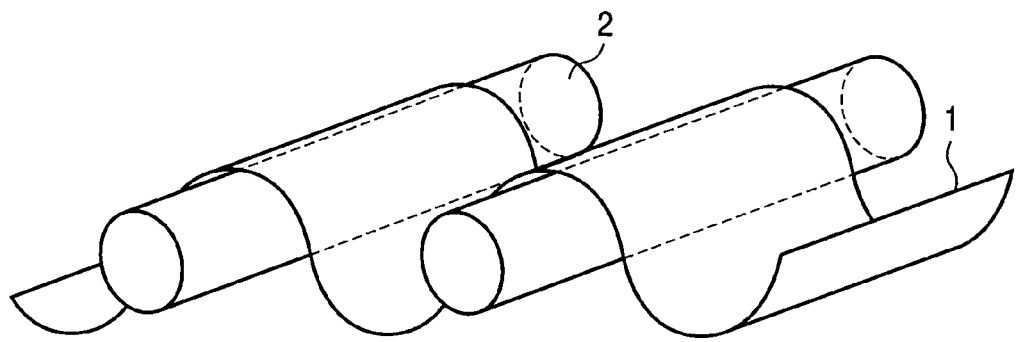
FIG. 4 is an enlarged view of a pixel portion of the display surface shown in FIG. 1.

FIG. 3 is a schematic view showing a plane configuration example of an X-Y plane of FIG. 1. In the present embodiment, the scanning line 1 is arranged alternately with respect to an integrated structure of the optical waveguide 2. Further, the arrangement related to the present invention is not limited to this. Therefore, for example, as shown in FIG. 4, it is also fine to arrange the optical waveguides 2 only in the convex portions with respect to the corrugated scanning line 1.

Figure 5:
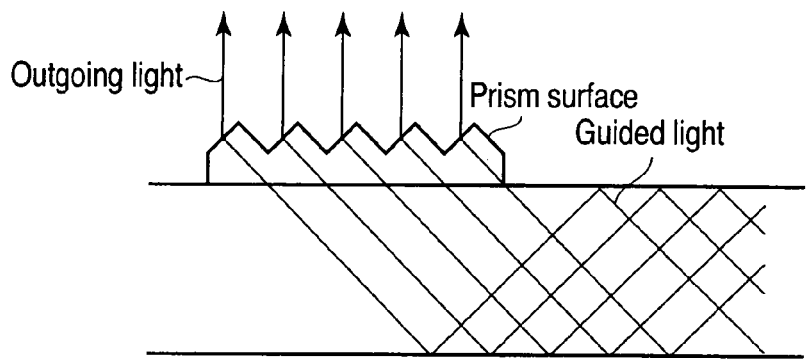
FIG. 5 shows an example of a light output element which uses a prism.
Figure 6:
FIG. 6 shows a schematic example of a light output element which uses a multilayer film having different refractivity.
Figure 7:
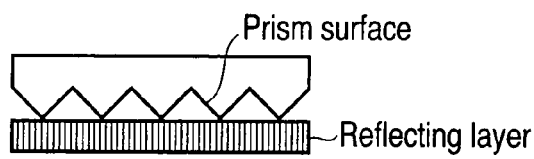
FIG. 7 shows a schematic example of a light output element which is able to emit light by a reflectance mode.

Further, by changing the configuration of the light output element, light can be emitted in a transmittance direction or a reflectance direction with respect to the optical waveguide 2. The configuration of the light output element is shown in FIGS. 5, 6 and 7. For example, as shown in FIG. 5, light can be emitted in a desired light emitting direction by changing the propagation direction of guided light in optical waveguide 2, and obtaining a transmittance mode by producing a prism surface. Further, light can be emitted similarly by using a multiple layer film as shown in FIG. 6, which has different refractivity. Further, as show in FIG. 7, a reflectance mode can be operated by providing a light output element in which a reflecting layer faces the prism surface.

In the case of the configuration of a display apparatus shown in FIG. 1, scanning operation can be carried out in different operation modes among the adjacent optical waveguides 2. For example, in the configuration shown in FIG. 1, for optical waveguides 2 arranged in the convex portions of the corrugated scanning line, light can be emitted in the transmittance mode, and for the optical waveguides 2 arranged in the concave portions adjacent to these optical waveguides 2, light can be emitted in the reflectance mode. In this manner, scanning can be carried out in different modes. Meanwhile, in the arrangement shown in FIG. 4, each optical waveguide 2 is, for example, operated by a single mode, such as a transmittance mode. In this case, stress is added to each optical waveguide 2 by the displacement occurred to the convex portion upon selecting scanning line. However, by applying an electric field to the concave portion so as to compensate this displacement, the entire scanning line would be able to offset the variation. Accordingly, the present operation is able to provide different displacements between the concave portion and the convex portion and offset the displacements in a set of concave and convex portions of the scanning line 1. Therefore, the operation is able to reduce the load in the entire selected scanning line.

Figure 8A:
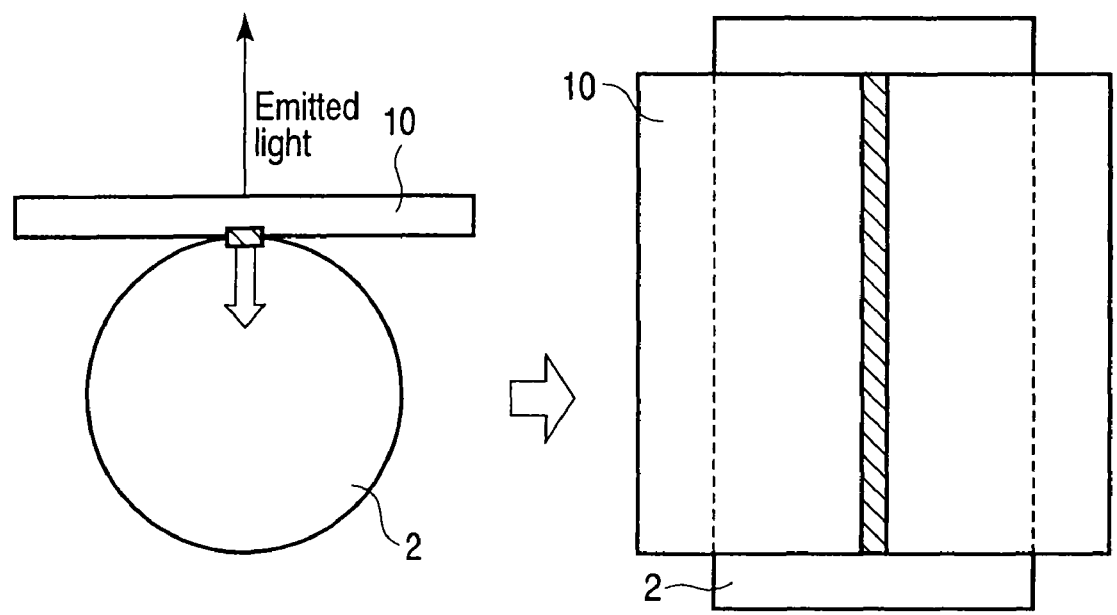
FIG. 8A is a schematic view of a light emitting area in a display apparatus using a plate-like scanning line.

Further, by employing the shape of the scanning line disclosed in the present embodiment, it is possible to increase the area of the contact portion in the light emitting area. FIG. 8A is a schematic view showing a cross section configuration in a case where a plate-like scanning line 10 used for emitting light contacts the optical waveguide 2 having an circular cross section relatively easy to make. In this case, as shown in FIG. 8A, since the contact area contacts the circular cross section at a contact point, light which can be emitted upon scanning is limited to a narrow area. In the case of a structure shown in FIG. 8A, although it is possible to apply large stress locally to the contact portion, in order to expand the contact area, it is necessary to apply an amount of stress which can deform the optical waveguide 2 or the plate-like scanning line 10 for emitting light. Therefore, the piezoelectric material used for a scanning line and the shape thereof may be limited or may be subjected to a larger load.

Figure 8B:
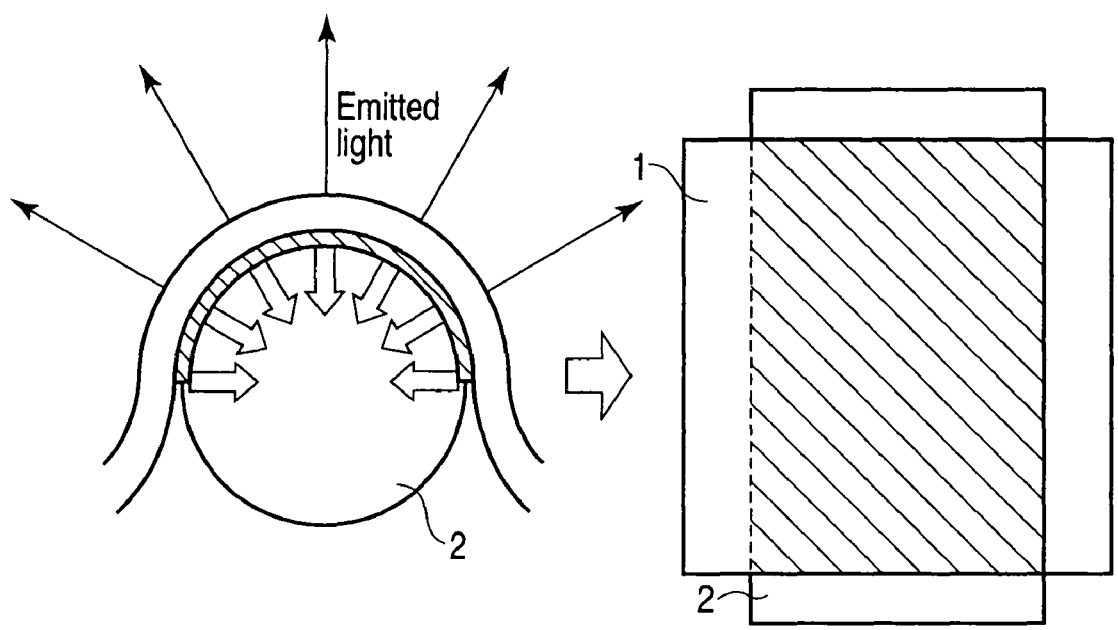
FIG. 8B is a schematic view of a light emitting area in the display apparatus shown in FIG. 1.

In contrast, in the present embodiment, as shown in FIG. 8B, the scanning line 1 for emitting light contacts the optical waveguide 2 along the shape of its circumference. Therefore, it is possible to give stress to the optical waveguide 2 in a wider contact surface. In this manner, it is possible to widen the area in which light can be emitted upon scanning in comparison to the case of FIG. 8A. Further, for example, even in a case where the surface of the optical waveguide 2 is uneven to a certain extent, therefore, is hubbly, as shown in FIG. 8B, since the optical waveguide 2 is subjected to stress vertically from the corrugated scanning line 1 in each contact portion and has the corrugated piezoelectric film displaced in accordance with its unevenness, it is possible to prevent formation of a void caused by unevenness. Accordingly, a display apparatus whose structure can be formed easily and which can emit light with high efficiency can be realized.

Further, by using an optical waveguide 2 which has a circular cross section as shown in FIG. 8B, upon scanning, light can be emitted from a light emitting surface in a vertical direction with respect to the circumference of the optical waveguide. Therefore, light can be emitted from a wider light emitting direction than in the case shown in FIG. 8A. In other words, the present embodiment has an advantage in that it can not only increase the entire emitted light but also widen the visible range of display referred to as a viewing angle.

Figure 9:
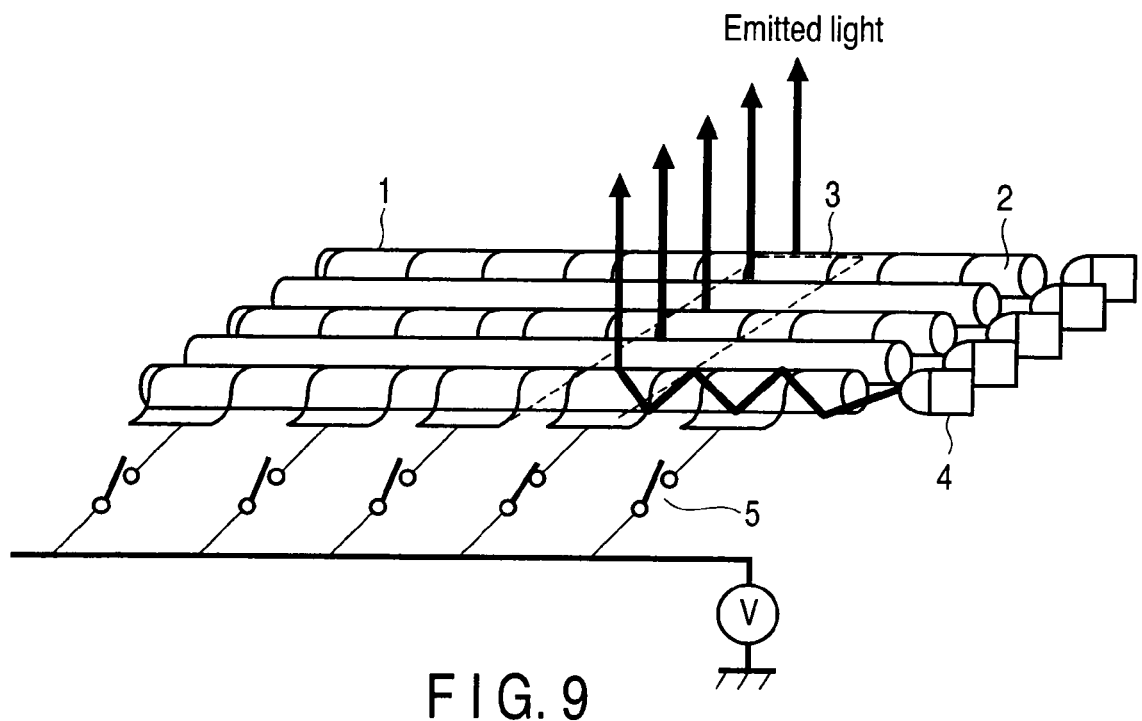
FIG. 9 shows an entire configuration example of the display apparatus shown in FIG. 1.

FIG. 9 shows an entire configuration example of the display apparatus according to the present embodiment. The display apparatus has an optical waveguide 2 upon which light in accordance with the information to be displayed is incident from a light source 4, a scanning line 1 which is capable of emitting light selectively from a part of the optical waveguide 2, a line selecting device 5 for successively selecting a scanning line 1 from which light should be emitted, and a power source for controlling an electric field of the scanning line 1. In the case where, for example, a piezoelectric material is used for the scanning line 1 selected by the line selecting device 5, the scanning line undergoes displacement by operating the electrical potential of the scanning line. In this manner, stress is given to the optical waveguide 2 so that total reflection conditions of the optical waveguide 2 are disturbed at the portion where the stress is applied. Total reflection conditions can be disturbed by employing a structure such as forming a portion of the scanning line 1 from which light is emitted by a material having higher refractivity than the optical waveguide 2, or adding a light output element as shown in FIGS. 5, 6 and 7 to such portion of the scanning line 1.

Figure 10:
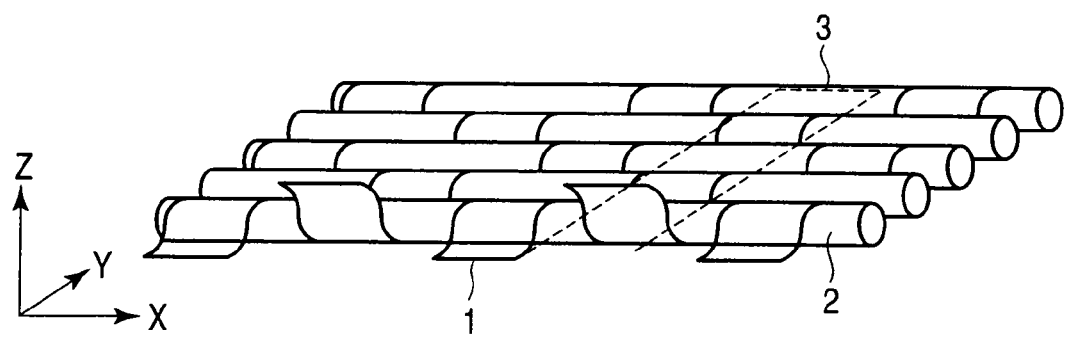
FIG. 10 shows another configuration example of a scanning line arrangement.

FIGS. 10 and 11 are schematic examples of a structure showing positional relations between an optical waveguide integrated structure and a scanning line group of the display apparatus, in a case where the scanning line is arranged alternately with respect to the optical waveguide in FIG. 9. As shown in FIGS. 10 and 11, the concave and convex portions of each scanning line 1 are arranged alternately with respect to the optical waveguide 2. Further, as shown in FIG. 11, the concave-convex configuration is arranged alternately for the neighboring scanning lines 1. In other words, each scanning line 1 is corrugated so that the concave portion and the convex portion are arranged adjacent to each other with respect to each optical waveguide 2. FIG. 12 shows an example of a cross-sectional configuration of the scanning line viewed from a Y-Z plane. The drawing shows that each scanning line 1 has a portion which covers the upper portion of the optical waveguide 2 and a portion which covers the lower portion of the optical waveguide 2 positioned alternately. FIG. 13 is a schematic example showing a state of displacement as a result of adding a predetermined electrical potential to the scanning line in FIG. 12. In FIG. 12, the portions of the scanning line 1 positioned to the upper side of the optical waveguides 2 have undergone displacement in a contractible direction with respect to the optical waveguide 2. The portions positioned to the lower side of the optical waveguide 2 have undergone displacement in an extendible direction with respect to the optical waveguide 2. In this state, the area in which the scanning line is arranged to the upper side of each optical waveguide 2 can come in contact with the scanning line 1 or can be given stress. Therefore, for example, by arranging the light output element shown in FIGS. 5, 6 and 7 between the optical waveguide 2 and the scanning line 1 positioned on the upper side, light can be emitted from the optical waveguide 2.

Figure 14:
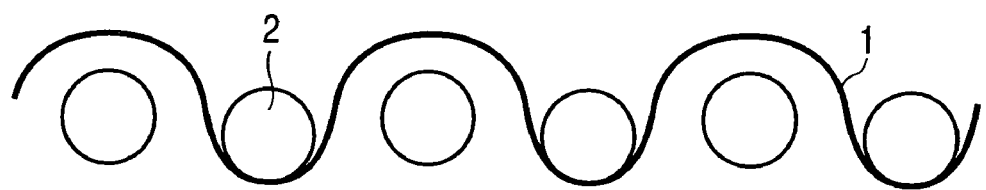
FIG. 14 shows another example of a state in which the scanning line shown in FIG. 12 has undergone displacement.

Meanwhile, FIG. 14 is a schematic example showing a state of displacement which is obtained by adding an electrical potential which is different from that of FIG. 13 to the scanning line. FIG. 14 is different from FIG. 13 in that the areas in which the scanning line 1 is positioned to the upper side of the optical waveguides 2 have undergone displacement in an extendible direction with respect to the optical waveguides, and that the areas in which the scanning line 1 is positioned to the lower side of the optical waveguides 2 have undergone displacement in a contractible direction with respect to the optical waveguides 2. Accordingly, in the area in which the scanning line 1 is arranged to the lower side of each optical waveguide 2, the scanning line 1 can come in contact with or stress can be given to each of the optical waveguide 2. Therefore, for example, by arranging the light output element as shown in FIGS. 5, 6 and 7 between the optical waveguide 2 and the scanning line 1 positioned on the lower side, light can be emitted from the optical waveguide 2.

As shown in FIGS. 13 and 14, in the neighboring optical waveguides, since the directions of displacement contradict between the concave portion and the convex portion of the scanning line 1, the contractible direction and the extendible direction can reduce or offset the displacement. In this manner, the effect of the contractible direction can be enhanced by the effect of the extendible direction, and the amount of displacement can be reduced between the extendible direction and the contractible direction for the selected scanning line 1. Therefore, it is possible to obtain a stable device operation in which the displacement of the entire scanning line is reduced or offset.

Figure 15:
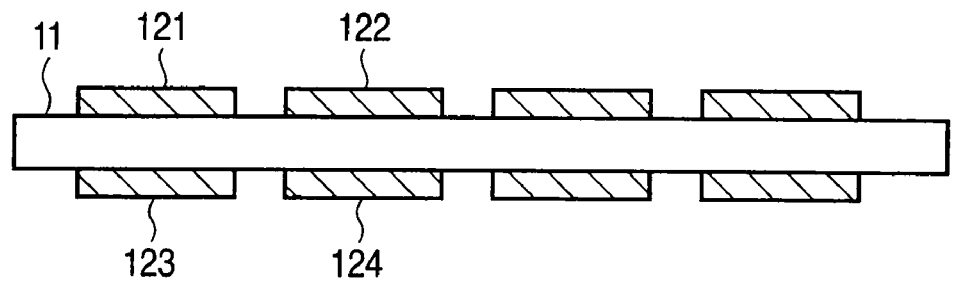
FIG. 15 shows a cross-sectional configuration example of an electrode arrangement in a scanning line.
Figure 16:
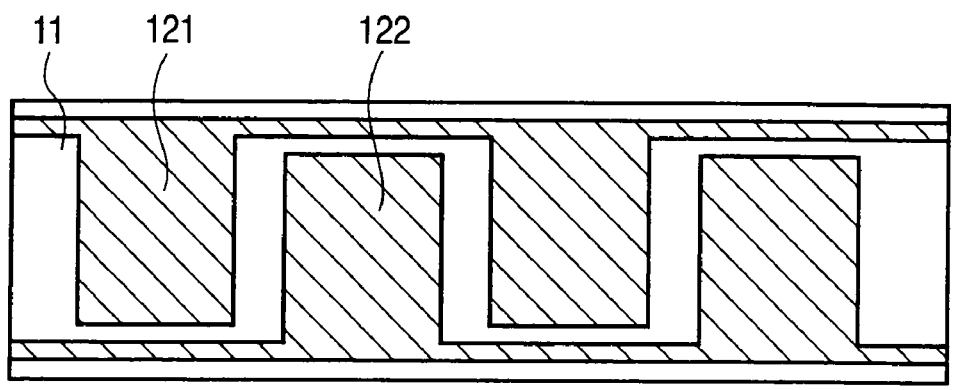
FIG. 16 shows a plane configuration example of the electrode arrangement shown in FIG. 15.

FIGS. 15 and 16 show an example of an electrode arrangement in the scanning line enabled to displace the scanning line in the present embodiment. FIG. 15 shows a cross-sectional configuration example, and FIG. 16 shows a plane configuration example. In the present embodiment, a structure which gives contradicting displacements to the alternately arranged optical waveguides 2 is required. This is operable, for example, by applying contradicting electric fields, i.e., positive or negative, between the area in which the scanning line 1 is positioned to the upper part and the area in which the scanning line 1 is positioned to the lower part with respect to the optical waveguide 2. Therefore, a desired displacement can be formed by arranging on both sides of a piezoelectric film formed of, for example, polyvinylidene difluoride (PVDF), or an organic material mixture including PVDF, a first electrode 121 and a second electrode 122 which gives displacement contradicting the first electrode 121 alternately in a position corresponding to a width of the optical waveguide 2, and a third electrode 123 and a fourth electrode 124 respectively in positions opposing the first electrode 121 and the second electrode 122. In other words, it is necessary to control the electrical potential difference which is applied between the first electrode 121 and the third electrode 123, and the electrical potential difference which is applied between the second electrode 122 and the fourth electrode 124 so as to give contradicting displacement.

Further, instead of using the scanning line structure in FIGS. 15 and 16, it is also fine to use a structure in which two or more layers of piezoelectric films are arranged and each of the displacement directions are functionally separated. FIGS. 17 and 18 show an example of an electrode arrangement configuration of the scanning line 1 in a case of a two-layered structure. FIG. 17 shows a cross-sectional configuration example, and FIG. 18 shows a plane configuration example. The configuration comprises an intermediate electrode 125 which is positioned between the first piezoelectric film 111 and the second piezoelectric film 112, a first electrode 121 positioned on the upper portion of the first piezoelectric film 111 and a second electrode 122 positioned on the lower portion of the second piezoelectric film 112. The first electrode 121 is formed in a pitch corresponding to the width of the optical waveguide 2. The neighboring electrodes are arranged so that every other optical waveguide 2 can be accommodated. Meanwhile, the second electrode 122 is formed in an area where the first electrode 121 is not formed, and corresponds to the width of the optical waveguide 2. By applying contradicting electrical potentials, i.e. positive or negative, to the first electrode 121 on the upper portion side and the second electrode 122 on the lower portion side, the present structure is able to form a scanning line in which neighboring displacements each corresponding to the width of the optical waveguide 2 contradict each other.

Further, FIG. 19 shows a cross-sectional view of another scanning line structure in detailed structure. As shown in FIG. 19, the scanning line comprises a first piezoelectric film 111 and a second piezoelectric film 112 comprised of a piezoelectric film such as PVDF, an intermediate electrode layer 125 positioned between the first piezoelectric film 111 and the second piezoelectric film 112, a first electrode 121 and a second electrode 122 formed in contact with the upper surface of the first piezoelectric film 111, and a third electrode 123 and a fourth electrode 124 formed in contact with the lower surface of the second piezoelectric film 112. The scanning line has a corrugated cross-section which has a convex portion whose inner surface is arranged to face a fiber shaped optical waveguide 2, and a concave portion whose inner surface is arranged to face a line element 6.

The line element 6 is formed in the same size as the optical waveguide 2 by using, for example, acrylate resin which includes light absorbable pigment. The acrylate resin which includes light absorbable pigment does not introduce light, however, functions as a black matrix for making the boarder between pigments clear in the display apparatus. Further, by arranging the line element 6 alternately with the optical waveguide 2, light can be emitted in the same direction, such as, for example, on the display surface side. In the present embodiment, in order to enable light to be emitted efficiently from the optical waveguide 2, a light output function layer 13 is arranged between the optical waveguide 2 and the second electrode 122. As mentioned above, the light output function layer 13 uses, for example, refraction effect using micro prism or scattering effect obtained by minute particles to emit light more efficiently when selecting the operation of emitting light from the optical waveguide 2.

In the configuration shown in FIG. 19, it is possible to apply different electrical potentials between, for example, the first electrode 121 formed in a position corresponding to the optical waveguide 2 and the third electrode 123 formed in a position corresponding to the line element 6. Further, it is also possible to apply different electrical potentials similarly between the second electrode 122 and the fourth electrode 124. Accordingly, depending on the direction of polarization of the first piezoelectric film 111 and the second piezoelectric film 112, and how the electrical potential is applied to the first to fourth electrodes 121 to 124 and the intermediate electrode 125, for example, it is possible for the scanning line portion on the optical waveguide 2 to undergo displacement in a direction to contact the optical waveguide 2, and, simultaneously, the scanning line portion on the line element 6 to undergo displacement in a direction to dissociate from the line element 6. In this manner, light can be emitted from the optical waveguide 2 which is positioned on the scanning line, through the light output function layer 13. Further, in the case of using the operation method of the present scanning line, the scanning line portion facing the optical waveguide 2 and the scanning line portion facing the line element 6 operate differently from each other. In other words, the scanning line portion facing the optical waveguide 2 undergoes displacement in a direction in which a curvature radius reduces, and the scanning line portion facing the line element 6 undergoes displacement in a direction in which a curvature radius increases. This enables the entire scanning line to operate so as to compensate or cancel the variation.

Further, in the scanning line structure in FIG. 19, the device structure can be stabilized by providing a spacer respectively between the optical waveguide 2 and the scanning line 1, and the line element 6 and the scanning line 1.

FIG. 20 shows a detailed structure of a cross-section of the scanning line in this case. As shown in FIG. 20, a first spacer 141 is arranged between the optical waveguide 2 and the light output function layer 13, and a second spacer 142 is arranged between the line element 6 and the second electrode 122. By attaching both ends via the first spacer 141 and the second spacer 142, the arrangement between the optical waveguide 2 and the line element 6 can be maintained. Simultaneously, it is possible to form a display surface whose configuration can be maintained by the optical waveguide 2, the line element 6 and the scanning line. In such case, it is desirable that the first spacer 141 and the second spacer 142 are made of reflective materials or materials having lower refractivity than the optical waveguide 2, so that the surface which comes in contact with the optical waveguide 2 does not disturb the total reflection in the optical waveguide 2.

Figure 21:
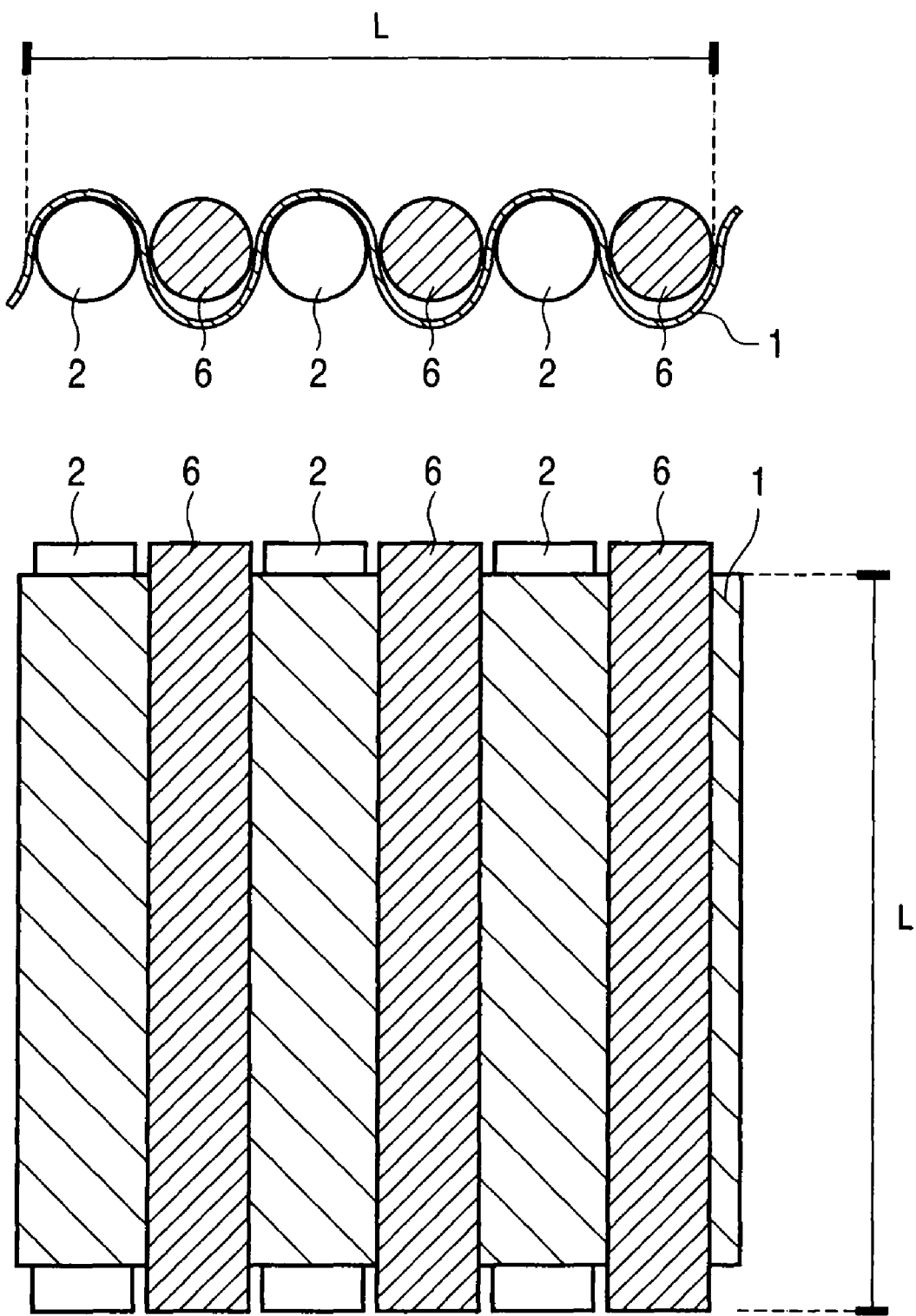
FIG. 21 shows a configuration of a pixel in a case where each of the RGB lights is independently incident upon each optical waveguide.

FIG. 21 shows a configuration of a pixel in a case where red (R), green (G) and blue (B) light beams are respectively and independently incident upon each optical waveguide 2.

In FIG. 21, on the upper side is shown an example of a cross-sectional configuration and on the lower side is shown an example of a plane configuration. The size corresponding to the pixel of the display apparatus can be defined by the thickness of optical waveguide 2 and the line element 6 to be used and the width of the scanning line 1 configured with, for example, a piezoelectric film. Here, as shown in FIG. 21, a basic configuration of one pixel is an area defined by three pieces of optical waveguides 2 and three pieces of line element 6, i.e. a total of six pieces, enclosed by the width of the scanning line 1. Therefore, an area L shown in FIG. 21 corresponds to the pixel size.

Accordingly, by selecting the width of the scanning line 1 and the thickness of the optical waveguide 2 and the line element 6 in accordance with the specification required for the display apparatus, it is possible to configure a display apparatus having arbitrary definition. For example, in a case of manufacturing a display apparatus with a 100-inch diagonal screen having a 1920- by 1080-pixel resolution, the size of one pixel should be approximately 1.15 mm×1.15 mm. In this case, the L in FIG. 21 can each be made 1.15 mm by arranging the pitch between the optical waveguide 2 and the line element 6 at approximately 0.042 mm using circular optical waveguides 2 and linear bodies 6 having cross-sections of 0.15 mm in diameter, and arranging a 0.15 mm pitch between scanning lines 1 having a width of 1.0 mm.

In this manner, according to the present embodiment, a display apparatus can be manufactured arbitrarily by selecting the size of the optical waveguide, the line element and the scanning line in accordance with the desired screen size and the number of pixels. Conversely, it is also possible to realize a free screen size and number of pixels by combining an optical waveguide, line element and scanning line which have predetermined sizes.

Figure 22:
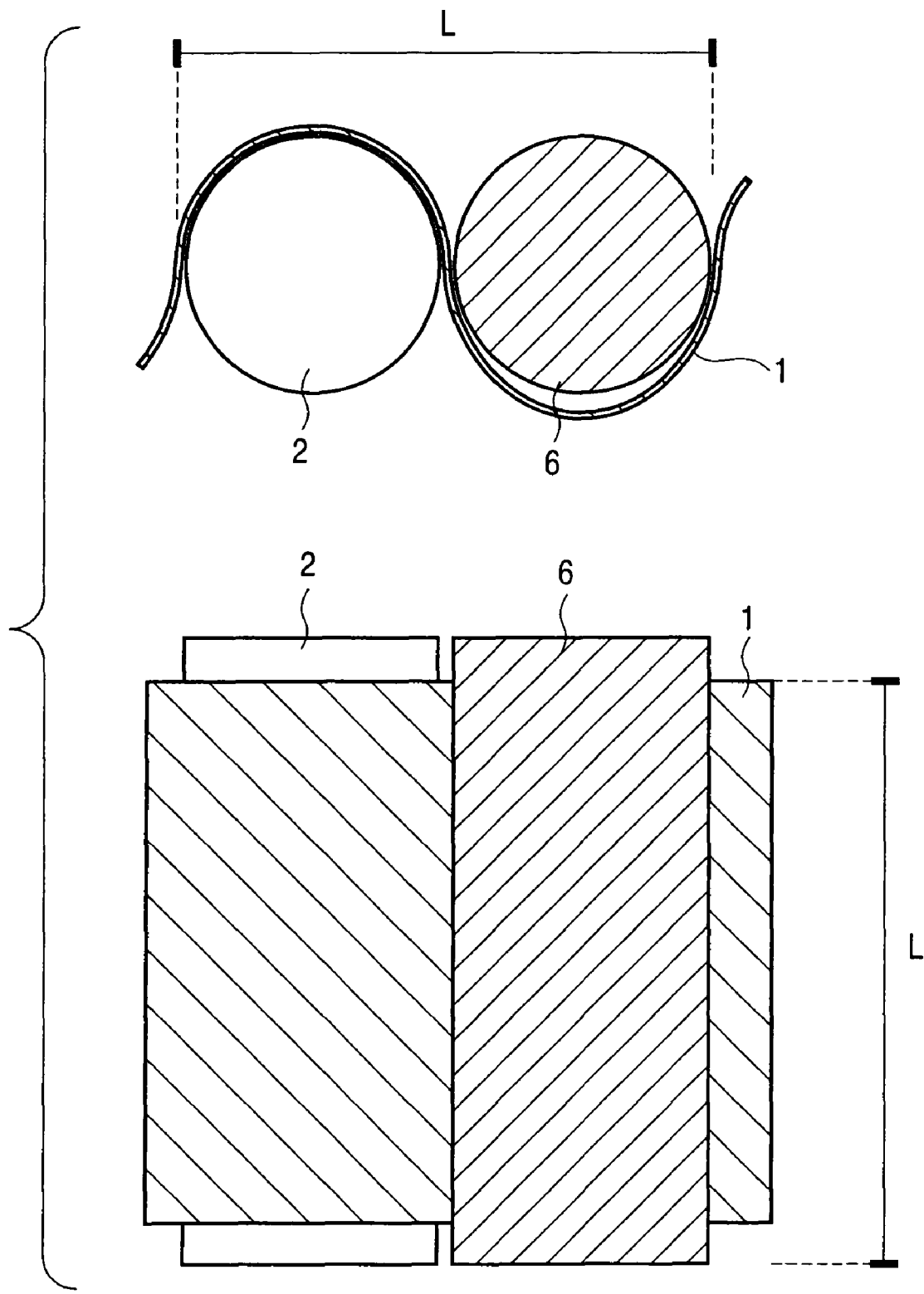
FIG. 22 shows a configuration of a pixel in a case where light blended with RGB is incident upon an optical wave guide.

Further, as shown in FIG. 22, it is also fine to mix light with colors of, such as, R, G and B components in advance in the light source, and have such light beam incident upon the optical waveguide 2.

FIG. 22 shows examples of a cross-sectional configuration and a plane configuration corresponding to a pixel in such configuration. In this case, since a light beam including the R, G and B components can be incident from the light source upon one optical waveguide 2, it is not necessary to divide colors by spatial or time division such as in a conventional display device. In this manner, in the case of manufacturing a display apparatus with a 100-inch diagonal screen having a 1920- by 1080-pixel resolution as mentioned earlier, this can be realized by, for example, preparing the cross-sections of the optical waveguide 2 and the line element 6 at 0.50 mm in diameter despite maintaining the scanning line width the same, and arranging the pitch between the optical waveguide 2 and the line element 6 at 0.075 mm. Here, the definition is set as 1920- by 1080-pixel resolution corresponding to 100 inches diagonally. In the present invention, the definition of a display apparatus can be changed easily by changing the diameters of the optical waveguide 2 and the line element 6 to be used and the width of the scanning line 1. Further, in the present embodiment, the optical waveguide 2 and the line element 6 are described to be in same shapes. However, the shapes need not be the same.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A display apparatus comprising:
   a plurality of optical waveguides which are arranged in a row and have light output areas;
   a plurality of light sources which emit light beams incident upon the optical waveguides;
   a plurality of scanning lines whose corrugated cross-sections have convex portions and concave portions alternately positioned in a column, wherein inner surfaces of each of the convex portions and the concave portions are arranged so as to face the optical waveguides with a space between the inner surfaces and the optical waveguides, and the convex portions and the concave portions are displaced by applying an electric field to come in contact with light output areas in accordance with a shape of cross-sections of the optical waveguides; and
   a control unit which controls the scanning lines with the application of an electric field sequentially.

2. The apparatus according to claim 1, wherein the displacement causes action such as to contact or apply stress to the optical waveguides.

3. The apparatus according to claim 2, wherein the action disturbs total reflectance conditions of the optical waveguides so that the scanning lines are capable of emitting light selectively from the light output areas.

4. The apparatus according to claim 1, further comprising a light output element which is arranged between the optical waveguide and the scanning line so as to disturb total reflectance conditions.

5. The apparatus according to claim 1, wherein
   the scanning line includes at least one piezoelectric layer having flexibility and a plurality of electrode layers which are arranged so as to sandwich the piezoelectric layer from both sides in a thickness direction, and
   the control unit controls the scanning lines with the application of an electric field among the electrode layers.

6. The apparatus according to claim 1, wherein
   the scanning lines undergo displacements which are different between the convex portions and the concave portions, and the displacements undergone by the convex portions and the displacements undergone by the concave portions are compensated or canceled.

7. The apparatus according to claim 1, further comprising a light-absorbing line element which is arranged in between each of the optical waveguides.

8. The apparatus according to claim 1, further comprising a spacer which is arranged between the optical waveguide and the scanning line.

* * * * *